June 14, 1960     E. E. ERIKSON     2,940,781

WHEEL ASSEMBLY

Filed Oct. 24, 1957

INVENTOR.
ERIK E. ERIKSON
BY
Robert A. Sloman
ATTORNEY

United States Patent Office 2,940,781
Patented June 14, 1960

2,940,781

WHEEL ASSEMBLY

Erik E. Erikson, St. Clair Shores, Mich.
(35135 Groesbeck Highway, Mount Clemens, Mich.)

Filed Oct. 24, 1957, Ser. No. 692,194

1 Claim. (Cl. 287—53)

This invention relates to a wheel assembly and more particularly to a wheel assembly for a plastic vehicle model or toy.

It is the primary object of the present invention to provide a novel hub cap assembly for the wheel together with means for securing the wheel immovably upon the wheel axle.

It is another object herein to provide a self-locking hub cap mountable upon the web of a wheel and which when assembled will not become accidentally disassembled.

These and other objects will be seen from the following specification and claim in conjunction with the appended drawing in which:

It will be understood that the above drawing illustrates merely a preferred embodiment of the invention and that other embodiments are contemplated within the scope of the claim hereafter set forth.

Figure 1:
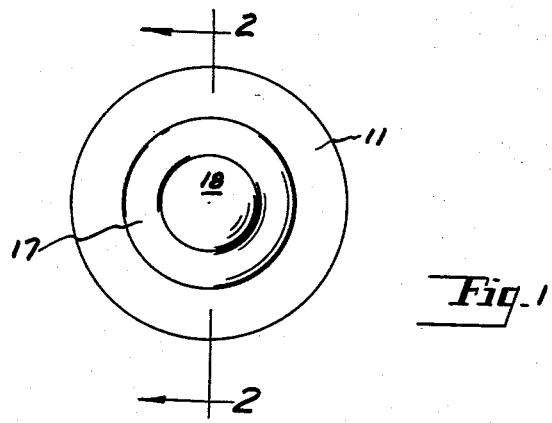
Fig. 1 is a side elevatonal view of the present wheel assembly.
Figure 2:
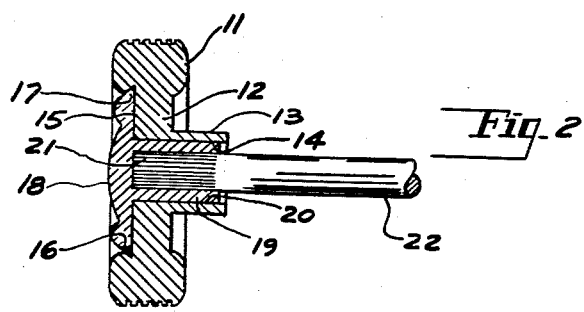
Fig. 2 is a section on line 2—2 of Fig. 1.
Figure 3:
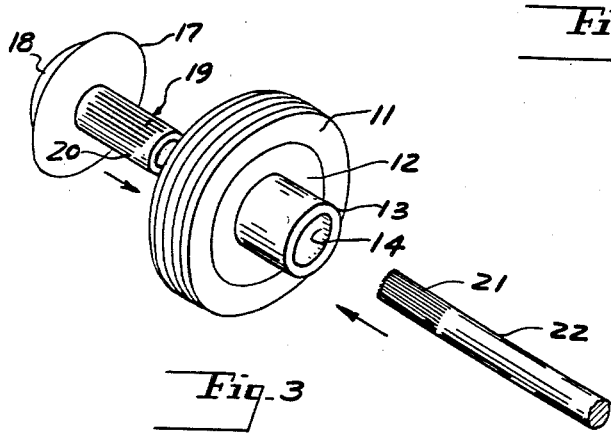
Fig. 3 is a perspective exploded view thereof.

The present wheel assembly as shown in Figs. 1, 2 and 3 comprises a wheel having a wheel body 11 and the centrally apertured web 12, one of whose upright sides is flat as at 15. The web terminates on one side in the centrally apertured hub 13 whose axial bore 14 registers with the corresponding central opening in the web.

Hub 13 projects laterally beyond one side of web 12 an appreciable distance beyond the outer edge of wheel body 11.

The flat side 15 of the web terminates in the outer annular undercut recess 16 which extends into the central portion of body 11 and is adapted to retainingly receive the outer annular oversize edge 17 of hub cap 18. The inner surface of the hub cap is flat corresponding to surface 15 on web 12 and is adapted for cooperative registry therewith.

Hub cap 18 terminates on one side in the centrally apertured hub 19 which has upon its exterior a series of serrations or splines 20 whereby upon assembly, hub 19 is immovably and retainingly secured within the central portion of web 12 and wheel hub 13.

In the preferred embodiment of the invention wheel body 11 including web 12 and hub 13 is constructed of a relatively soft plastic material such as polyethylene. The hub cap 18, including its hub 19 is made of relatively hard plastic material such as high impact styrene. The purpose of this is that after assembly of the parts the difference in hardness of the two materials facilitates their remaining in assembled relation.

This is further brought out by the fact that the outer annular edge 17 of the hub cap is oversize with respect to the inlet of the undercut recess 16 in the wheel body. Due to the elasticity of the soft wheel body the relatively hard oversized edge 17 of the hub cap may be snapped into place where it will remain against accidental dislodgment. The serrations or splines 20 on the hub cap hub 19 also cooperate with the web 12 and hub 13 for further securing hub 19 within hub 13.

The assembly is completed by the projection of the serrated or splined end 21 of axle shaft 22 into and through hub cap hub 19 where it is retainingly engaged thereby. Shaft 22 snugly fits the bore of hub 19 to further facilitate the anchoring of the hub cap hub over the end of said axle, and in turn the wheel thereon.

Figure 4:
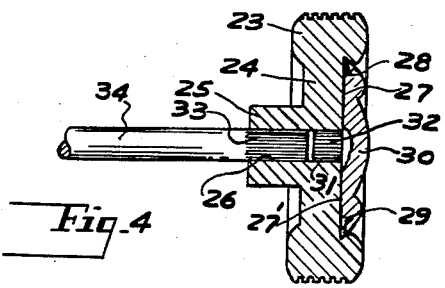
Fig. 4 is an elevational section similar to Fig. 2 illustrating a slightly different construction.

A slight variation of the present wheel assembly is shown in Fig. 4 wherein the wheel consists of body 23, web 24 and hub 25 having a central bore 26 adapted to receive the serrated or splined end 33 of wheel axle shaft 34.

The outer surface of said web is flat at 27 and is adapted to receive in engagement therewith the internal flat surface 27' or hub cap 30.

Surface 27 of said web terminates at its outer portion in the annular undercut recess 28 which extends into the wheel body and is adapted to retainingly receive the oversized annular edge 29 of said hub cap. This provides an effective means of immovably securing the hub cap upon and with respect to the wheel body 23.

Solid hub 31 projects laterally from the inner and central portion of hub cap 30 and has a series of serrations or splines 32 which are cooperatively and retainingly received within the wheel hub bore 26 for further securing said hub cap immovably with respect to the wheel body.

The wheel body 23, web 24 and hub 25 are formed of a relatively soft plastic material such as polyethylene whereas the hub cap is formed of a relatively harder styrene.

The purpose of this is to provide a more effective assembly inasmuch as the flexible body 23 is adapted to yield-temporarily under the forceful projection of the hub cap into assembled relation with its solid hub 31 aligned with shaft 34.

Having described my invention, reference should now be had to the claim which follows.

A wheel assembly comprising a wheel body including a web and a centrally apertured hub projecting laterally beyond one side of said web, the other side of the web being flat and terminating in an outer annular undercut recess extending into said body, a disc shaped hub cap flat on one side registering with the flat side of the web, and having an outer annular oversize edge retainingly nested within said undercut recess, an apertured hub centrally projecting from the flat side of said hub cap and snugly and retainingly nested within the wheel hub and extending partially therein, an axle shaft at one end tightly projected into the hub of said hub cap, and serrations upon the outer surfaces of said hub cap hub and said shaft for gripping engagement with said wheel hub and hub cap hub respectively.

References Cited in the file of this patent

UNITED STATES PATENTS

| 242,692 | Pratt et al. | June 7, 1881 |
| 369,310 | Alden | Sept. 6, 1887 |
| 2,665,521 | Ford | Jan. 12, 1954 |

FOREIGN PATENTS

| 928,956 | France | June 16, 1947 |
| 824,916 | Germany | Dec. 13, 1951 |